United States Patent [19]
Ivers

[11] Patent Number: 5,844,673
[45] Date of Patent: Dec. 1, 1998

[54] AXIAL LED POSITION DETECTOR FOR DETERMINING THE ANGULAR POSITION OF A ROTATABLE ELEMENT

[75] Inventor: Richard J. Ivers, West Newton, Mass.

[73] Assignee: Cambridge Technology, Inc., Cambridge, Mass.

[21] Appl. No.: 61,935

[22] Filed: Apr. 17, 1998

[51] Int. Cl.⁶ .................................................. G01D 5/34
[52] U.S. Cl. .................................... 356/138; 250/231.13
[58] Field of Search ............................... 356/138, 152.1, 356/153; 250/231.13, 231.14

[56] References Cited

U.S. PATENT DOCUMENTS

| | | | |
|---|---|---|---|
| 3,480,788 | 11/1969 | Barbieri et al. | 250/237 |
| 4,056,722 | 11/1977 | Ray | 250/231.13 |
| 4,207,463 | 6/1980 | Iyeta | 250/231 SE |
| 4,864,295 | 9/1989 | Rohr | 340/870.37 |
| 5,235,180 | 8/1993 | Montagu | 250/231.13 |
| 5,671,043 | 9/1997 | Ivers | 356/138 |

FOREIGN PATENT DOCUMENTS 63-30705  2/1988  Japan .

OTHER PUBLICATIONS

Jean Montagu & Al Bukys, "Moving Magnet Galvanometer Scanners A New Generation," Presented at the Space Microdynamics and Accurate Control Symposium, Dec. 1, 1992.

6800/CB6588 Mirror Positioning System Instruc. Manual, Cambridge Technology, Inc., Watertown, MA, 1989–Feb. 1, 1994, pp. 9–18 (complete pub. avail in file of U.S. Patent No. 5,671,043).

*Primary Examiner*—Hoa Q. Pham
*Attorney, Agent, or Firm*—Jacob N. Erlich; Jerry Cohen

[57] ABSTRACT

A position detector for determining the angular position of a rotatable element, the detector having a single light source for directing a uniform wide angle field of light in a direction generally along the longitudinal axis of the rotatable element, multiple sector-shaped light detectors aligned circumferentially about the rotatable element to receive light directly from the source, and a light blocker connected to the rotatable element to rotate therewith about the longitudinal axis for periodically blocking portions of the light which impinge upon the light detectors from the light source. The space between the light source and the detectors being essentially free of any object, except for the light blocker, so that the light from the light source can impinge directly upon at least those portions of the detectors which the light blocker is not blocking, without passing through any other object. A linear output of each of pairs of connected detectors being utilized to provide a reliable measurement of the angular position of the rotatable element.

26 Claims, 2 Drawing Sheets

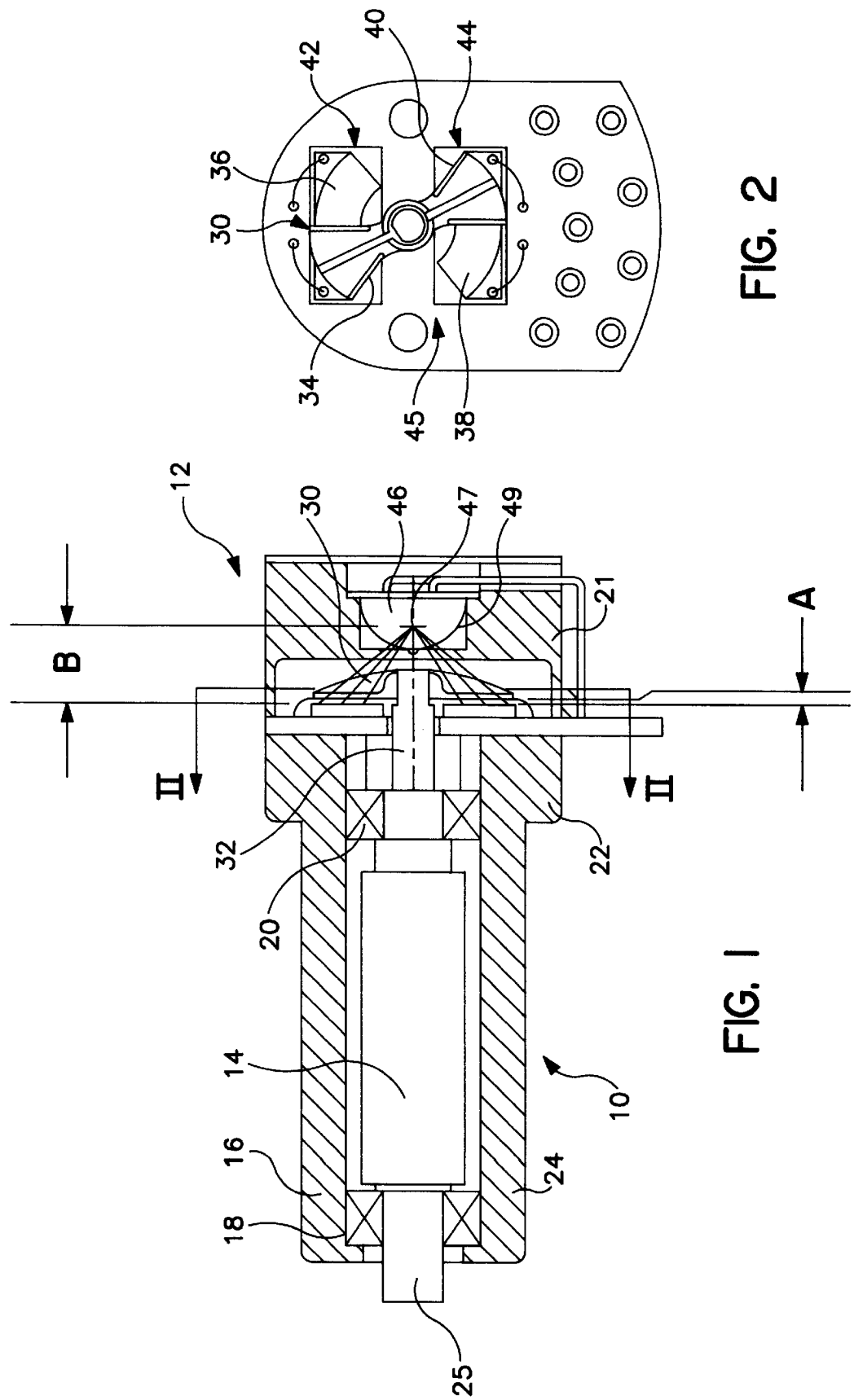

AXIAL LED POSITION DETECTOR FOR DETERMINING THE ANGULAR POSITION OF A ROTATABLE ELEMENT

BACKGROUND OF THE INVENTION

This invention relates generally to devices capable of determining the angular position of a moving element and, more particularly, to an optical position detector which relies upon an axially aligned LED source which provides for an overall reduced size of the position detector.

Precision measurements of the rotary position of a rotating element, such as a shaft in a limited rotation motor, are often required as, for example, when using a rotating mirror to control the angular position of a laser light beam. There have been a number of different approaches used in the sensing and detecting of rotary motion. Many of these detectors are acceptable for some types of uses but have drawbacks associated therewith or are unsatisfactory for other types of uses.

Techniques using variable differential transformers have been found deficient because of their excessive sensitivity to the presence of magnetic fields. Variable potentiometers have been found to have excessive mechanical hysteresis characteristics and, particularly when used around the balanced, or zero, region of the angular position, are subject to oscillation or jitter, which has resulted in contact wear problems. Moreover, potentiometers tend to be subject to general problems of limited life due to their mechanical motions.

The capacitance sensing system, although capable of extreme accuracy, requires an on-board oscillator circuit capable of producing excitation to the capacitor system. It is difficult to package this circuitry into a small space and consequently a substantially increased cost of manufacture results therefrom. Furthermore, the moving dielectric butterfly member associated therewith has significant inertia, which becomes an increasingly large contributor to total inertia in the smaller motor sizes. The moving plate capacitance sensor, which may have low inertia, suffers from a variety of other drawbacks including high sensitivity to radial shaft motion and high output drift with temperature.

Position detectors based on the use of light detection techniques also suffer from problems of temperature instability, e.g., drifts, with time. Light detection devices can be vibration sensitive and often produce substantially non-linear operations, even over relatively small ranges of rotary motion. Other optical devices, using reflected light from a diffuser combined with an imaging lens have problems related to low signal production, poor accuracy and a large size leading to expensive manufacturing costs. The single light source/two photocell optical position detector is sensitive to radial shaft motion. This factor is extremely important because of its effect on angular positioning repeatability. Even minor unwanted radial movement of the shaft can substantially adversely effect the accuracy of the detector's output.

The position detector of the type set forth in U.S. Pat. No. 5,671,043 assigned to the present assignee of this application overcomes substantially all of the above problems associated with prior position detectors. But it is desirable to substantially reduce the size of such an optical detector and, if possible, to even further improve the accuracy of its measurements without a loss of the benefits of such a system.

It is therefore an object of this invention to provide an optical position detector capable of accurately detecting the angular position of rotatable elements.

It is another object of this invention to provide a position detector which is of extremely reduced size.

It is a further object of this invention to reduce the number of components, simplify assembly, and to generally lower manufacturing costs of an optical position detector.

SUMMARY OF THE INVENTION

The objects set forth above as well as further and other objects and advantages of the present invention are achieved by the embodiment of the invention described hereinbelow.

The optical position detector of the present invention is preferably placed adjacent one end of a scanner. The invention relies upon utilization of a uniquely shaped blocking member (preferably butterfly-shaped) affixed to an end of a shaft forming part of the scanner. The blocking member is utilized to partially block four large area sector-shape photosensors from receiving light emanating from a single LED source.

It is critical in the functioning of the present invention that the light source be located as close as possible to the photosensor. In addition, it is also essential that the butterfly-shaped blocking member, which is keyed to and rotates with the shaft, is also located extremely close to the photosensors. The light source is of the type which produces a uniform wide-angle field of light which is capable of illuminating all of the photosensors at one time. In so doing, the size of the position detector of the present invention is as compact as possible. Furthermore, the close proximity of the light source to the photosensors increases the intensity of received radiation, and, therefore, increases signal production. All of the above is accomplished without the inclusion of intervening elements between the butterfly-shaped blocking member and the light source and between the blocking member and the photosensors.

The utilization of a wide-angle light source enables a single LED to be utilized with the present invention. The single LED source illuminates all four photosensors at one time even when the source is located quite close to the photosensors. The light falling on the photosensors is circumferentially uniform. This is critical for the achievement of high accuracy results. As the butterfly blocking member rotates through incremental angles it covers and uncovers new incremental photosensor areas. In order for the output of the device to be linear, the new incremental areas must produce the same change in signals as previous incremental areas. This requires that the light intensity be circumferentially uniform thereby leading to the type of LED source utilized in the present invention.

As the butterfly-blocking member rotates or oscillates, it exposes more area from two of the photosensors and less area from the other two photosensors. The photosensors are diagonally cross-connected so that the summed output for one pair is increasing while the other pair is decreasing. These summed outputs are then connected to opposite sides of a differential amplifier to produce the final bi-directional linear output. The technique of the cross-connection has the effect of greatly reducing the sensitivity of the photosensors to spurious lateral and axial motion of the shaft.

During operation of the present invention, the photosensors produce an output current proportional to the total radiant energy which falls upon their active surfaces from the single light source. With constant intensity, the output of the photosensor is proportional to the area exposed to light. The currents of the pairs of diametrically opposed photosensors are summed and then connected to opposite sides of a differential amplifier to produce a final output. The final output from the photosensors represents the angular position (angle of rotation) of the rotatable or oscillatable shaft.

For a better understanding of the present invention, together with other and further objects thereof, reference is made to the accompanying drawing and detailed description of one or more preferred embodiments thereof and its scope will be pointed out in the appended claims.

BRIEF DESCRIPTION OF THE DRAWINGS

FIG. 1 is a cross-sectional view of a moving magnet scanner incorporating the optical position detector of a preferred embodiment of the present invention therein;

FIG. 2 is a front view of the moving magnet scanner of FIG. 1 taken along line II—II of FIG. 1;

DETAILED DESCRIPTION OF PREFERRED EMBODIMENTS

Figure 3A:
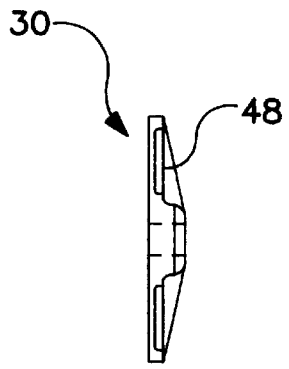
FIGS. 3A and 3B are a side view and front view, respectively, of the butterfly design of the blocking member utilized to partially cover the photosensitive areas of the photocells utilized within the optical position detector of the present invention.

Reference is now made to FIGS. 1 and 2 of the drawings which depict a preferred embodiment of the invention comprising a rotational device such as a moving magnet scanner 10 incorporating therein the optical position detector. Although this optical position detector is described with respect to a moving magnet scanner, it should be realized that this embodiment and other embodiments of the present invention is capable of being incorporated in and utilized with any device which requires detecting or sensing rotational or oscillational motion.

More specifically, the moving magnet scanner 10 includes, but is not limited to, rotatable shaft or shaft assembly 14 mounted for rotational or oscillational movement within a coil housing 16 which makes up the scanner body. The shaft assembly is held in place by a pair of bearings 18 and 20. Since the exact details of the moving magnetic scanner is not required for an understanding of the present invention, no further description of the remaining components thereof are necessary.

Still referring to FIGS. 1 and 2 of the drawing, the optical position detector is positioned adjacent one end 22 of the moving magnet scanner while the other end 24 preferably has a mirror (not shown) attached to end 25 of shaft. The mirror can be affixed directly by any conventional means to end 25 of shaft, commonly referred to as the scanner output shaft. It is the rotational movement or oscillational movement of this mirror, other component affixed to the shaft, which is detected or sensed. The remaining description will used the terms "rotation," "rotational," "oscillation" and "oscillational" interchangeably to represent both rotational or oscillational movement of shaft 14. Even further, the terms "rotation," "rotational," "rotary" and "rotatably" define both complete rotary motion or partial rotary motion i.e., oscillation, oscillational, accurate, traverse, or oscillatory motion. Any such rotary motion can of course, be converted to or from linear motion and any such motion in two dimentions can be converted to and from motion in three dimentions.

Still referring to drawings, the various components of the optical position detector 12 of the present invention are explained in greater detail. As shown in the figures, a butterfly-shaped blocking member 30 (shown clearly in FIGS. 3A and 3B of the drawings) is affixed to an end 32 of shaft. The butterfly-shape blocking member 30 extends in the radial direction as shown in FIGS. 1, 2, 3A and 3B so as to partially block four large area sector-shaped photosensors 34, 36, 38 and 40 making up a pair of two element photocells 42 and 44, respectively. One such two-element photocell 42 is clearly depicted in FIG. 4 of the drawings. The photocells 42 and 44 are positioned circumferentially about shaft as diametrically spaced arcs of a circle. This location of photocells 42 and 44 with respect to the blocking member 30 is shown in FIG. 2 of the drawings. The photosensitive areas (photosensors 34, 36, 38 and 40) of the photocells 42 and 44 are partially covered by the butterfly-shaped blocking member 30 which is made of an opaque material more fully described below.

Butterfly-shaped blocking member 30 is keyed to the shaft and rotates therewith. In addition, the back surface of blocking member 30 is spaced from the photocell surfaces by a relatively small distance, A, approximately 0.005 to 0.010 inches. This produces a sharply defined shadow edge projected to the cell surfaces. In so doing, there is little or no chance that stray light will leak around behind the butterfly blocking member 30 and spoil the sharp contrast between illuminated an non-illuminated zones. Further, the outer diameter of the butterfly blocking member 30 is sufficiently large to overlap the photosensitive areas thereby aiding in the elimination of problems associated with unwanted radial movement of the shaft 14.

Axially aligned with shaft 14 and extending in the longitudinal direction is a single LED source 46 which illuminates portions of the four of the photosensors 34, 36, 38 and 40 that are not covered by the butterfly-shaped blocking member 30. It is critical in the functioning of the present invention that the light source 46 be as close as possible to the photosensors, for example, a distance, B, of approximately 0.1–0.15 inches. The light source 46 should produce a uniform wide-angle field of light which is capable of illuminating all four photosensors at one time. In so doing, the size of the position detector is as compact as possible. Furthermore, the close proximity of the light source 46 to the photosensors increases the intensity of received radiation and therefore increases signal production. All of this is accomplished without the inclusion of intervening elements therebetween.

A detailed explanation of the type of LED source 46 is set forth below. A single LED illuminator or source 46 is used with the present invention. Source 46 is fixed to the scanner case 21 and is aligned directly on the axis of rotation. It projects light directly towards the photocell array. Inside the LED case 21 is a small chip 47 which is the actual source of radiation. The chip 47 is covered with a clear epoxy curved window 49. The small chip size combined with the refractive property of the window 49 makes the LED act as a point source of light. Light is distributed with uniform intensity through all angles in the forward direction. It is a wide angle emitter. This is important in understanding the overall function of the position detector of this invention. A wide angle light source means a single LED can be used to illuminate all four photosensors at once even when the LED source 46 is located quite close to the photosensors in order to provide as compact a package size as possible. Furthermore, the light falling on the photosensors is circumferentially uniform. This is critical for the achievement of high accuracy. As the butterfly blocking member 30 rotates through incremental angles it covers and uncovers new incremental photosensor areas. In order for the output to be linear the new incremental areas must produce the same change in signal as previous incremental areas. This requires that the light intensity be circumferentially uniform thereby leading to the type of LED source 46 used in the present invention.

An example of an LED source 46 would be a L2690 LED, although it should be realized that any other type of source which meets the above limitations can also be used with the present invention. The LED source 46 is designed to illuminate the entire interior of a hemisphere with very close to uniform intensity.

As the butterfly-blocking member 30 rotates (oscillates) it exposes more area from two of the photosensors 36 and 38 and less of the other two photosensors 34 and 40. The photosensors are diagonally cross-connected so that the summed output from one pair is increasing while the other pair is decreasing. These summed outputs are then wired to opposite sides of a differential amplifier to produce the final bi-directional linear output. This summing technique is identical to the summing technique and procedure as set forth in detail in U.S. Pat. No. 5,671,043, which is incorporated herein by reference. The technique of cross-connection as provided herein has the effect of greatly reducing the sensitivity of the sensors to spurious lateral and axial motion. Therefore, the position detector of the present invention can tolerate bending of the shaft 14 and/or shaft run out without producing an output equivalent to shaft rotation.

Figure 3B:
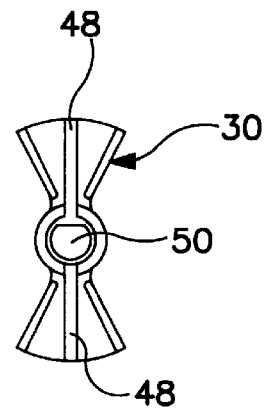
Figure 4:
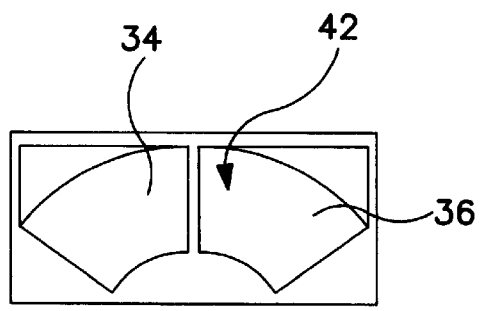
FIG. 4 is a front view of one of the two element photocells utilized with the optical position detector of this invention.

More specifically, and as shown in FIGS. 3A and 3B of the drawings, the butterfly-shaped blocking member 30 is preferably made by a plastic injection molding technique so as to be designed for extremely low cost. It should be recognized that equivalent techniques and materials can also be used to make this member. Since the plastic material is generally not very rigid, this particular butterfly-shaped blocking member 30 includes ribs 48 therein to act as stiffeners and to increase the vibration frequencies. These stiffener elements or ribs 48 are shown in FIG. 3B. Member 30 also includes a molded keyway flat 50 which enables blocking member 30 to be self-aligned to the shaft 14. The self-alignment of butterfly-shaped member 30 enables it to properly align with respect to the photocells 42 and 44 of photocell array 45.

Figure 5:
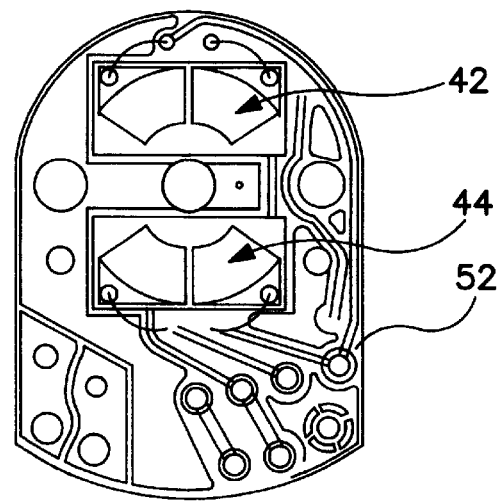
FIG. 5 is a front view of the photocell board assembly, including the pc board carrier utilized with this invention.

Reference is now made to FIG. 5 of the drawings which clearly depicts one photocell 42 of the two-element photocell array 45 made up of photosensors (active areas) 34 and 36. The photosensors are connected to a photocell board assembly 52 as shown in FIG. 5. Although not shown in FIG. 4, two-element photocell 44 is substantially identical to photocell 42. The photocells 42 and 44 preferably in the form of a silicon chip produced by conventional wafer lithography. The photocell active areas or photosensors 34, 36, 38 and 40 are sector-shaped to conform to the shape of the butterfly-shaped blocking member 30. This configuration enables the optical position detector 12 of the present invention to produce a linear output with respect to the shaft angle. FIG. 5 further depicts the connection of the photocell chips 42 and 44 to a printed circuit board 52 wherein the connections from the chip to the board are made via wire bond for ease of manufacture.

The photocell board 56 is custom-designed. The active photocell areas (photosensitive areas) are sector shaped and made to match the shape of the butterfly blocking member 30. The angular extent of the sectors is made to be slightly larger than the intended angular range of the position detector. A slight over-range is necessary in order to account for manufacturing tolerances. However, it is not desirable to make the sectors too wide, that is, to full quadrant size, because the additional exposed cell areas are not needed. They have the negative consequence of producing unwanted system noise.

In operation, as the shaft 14 rotates or oscillates through a limited angular degree of rotation, the blocking member 30 which rotates therewith prevents a portion of the light emanating from the LED source 46 from reaching the pair of two-element photocells 42 and 44. The blocking member 30 is so configured such that it is capable, in its fully rotated position such as shown in FIG. 2 of the drawings, of completely and simultaneously preventing light from source 46 from reaching diametrically opposed photosensors 34 and 40. At the other end of full shaft rotation blocking member 30 prevents light from reaching photosensors 36 and 38. In the null or zero position of shaft 14, half of each photosensor 34, 36, 38 and 40 is covered.

As the shaft 14 rotates, or, more specifically, oscillates, the photosensors 34, 36, 38 and 40 are blocked and unblocked accordingly. The blocking member 30 absorbs rather than reflects the light from source 46 and, therefore, blocking member 30 is made of non-reflective opaque material.

Photosensors 34, 36, 38 and 40 produce an output current proportional to the total radiant energy which falls upon their active surfaces. With constant intensity, the output of the photosensor is proportional to the area exposed to light. The currents of the pairs of diametrically opposed photosensors are summed and then wired into opposite sides of a differential amplifier to produce a final output. The specific summing technique is set forth in greater clarity in U.S. Pat. No. 5,671,043, which is incorporated herein by reference. It is important to realize that the cross connection of photocell pairs also provides for the cancellation of errors caused by possible radial movement of the rotor shaft in any direction. Error cancellation occurs because the summation of the diagonally interconnected exposed areas remains constant in the event of translational movement of the butterfly member. This can be seen by examining the differential geometry of the photocell areas covered by the butterfly blocking member 30. Therefore, radial translational movement does not produce an output equivalent to shaft rotation.

A similar compensation occurs for spurious axial shaft movement. However, the compensatory effect occurs in a slightly different way, and is the result of the symmetrical on-axis geometry of the illumination system. This is best explained by considering the action when the butterfly is in its null position. If the butterfly now moves axially, that is, along the axis of rotation there will be small but equal changes in the exposed areas of all four photocells. Because of the summing-then-differencing amplifier technique described above there will be no net change in the final output signal and therefore no sensitivity to axial movement. The final output from the photosensors represents the angular position (angle of rotation) of the rotatable (oscillatable) shaft 14.

Although the invention has been described with respect to a particular embodiment, it should be realized that this invention is also capable of a wide variety of further and other embodiments within the spirit and scope of the appended claims.

What is claimed is:

1. A position detector for determining the angular position of a rotatable element having a longitudinal axis that extends in an axial direction, the detector comprising:

a single light source for directing a uniform wide angle field of light in a direction generally along the longitudinal axis;

multiple sector-shaped light detectors aligned circumferentially about the rotatable element to receive light directly from said source, said detectors being arranged around the longitudinal axis and spaced from said light source, pairs of said multiple sector-shaped light detectors being opposed and electrically connected together, each of said pairs of diametrically connected detectors providing a linear output;

a light blocker operably connected to the rotatable element to rotate therewith about said longitudinal axis for periodically blocking portions of the light which impinge upon said light detectors from said light source, said light blocker having one surface thereof closely spaced from said light source and another surface thereof closely spaced from said light detectors, said linear output signal being correlatable to the rotational position of the light blocker; and output means for receiving the linear output of each of said pairs of connected detectors as inputs and a means for summing the outputs to each other to provide a reliable measurement of the angular position of the rotatable element.

2. The position detector as defined in claim 1 wherein said multiple sector-shaped light detectors comprise four sector-shaped light detectors.

3. The position detector as defined in claim 2, wherein the space between the light blocker and the detectors is essentially free of any object.

4. The position detector as defined in claim 3 wherein each of said multiple sector-shaped light detectors comprises of a photosensitive surface having a predetermined configuration and said light blocker is made of two light blocking segments, each of said segments configured to substantially match the predetermined configuration of said photosensitive surface of one of said sector-shaped light detectors.

5. The position detector as defined in claim 4 wherein said light source comprises a light emitter and a curved window covering said emitter.

6. The position detector as defined in claim 5 wherein window has a refractive property which enables the light source to act as point source of light that distributes light with uniform intensity through all angles in the forward direction thereby forming a wide angle emitter.

7. The position detector as defined in claim 1, wherein the space between the light source and the detectors is essentially free of any object, except for the light blocker, so that the light from the light source can impinge directly upon at least those portions of said detectors which the light blocker is not blocking, without passing through any other object.

8. The position detector as defined in claim 7 wherein said light blocker is of a butterfly configuration and includes means for maintaining the rigidity of said light blocker.

9. The position detector as defined in claim 8 wherein said means for maintaining the rigidity of said light blocker comprises at least one rigid rib.

10. The position detector as defined in claim 1, wherein the space between the light blocker and the detectors is essentially free of any object.

11. The position detector as defined in claim 1, wherein the space between said another surface of the light blocker and photosensitive areas of the detectors is approximately 0.005–0.010 inches.

12. The position detector as defined in claim 1, wherein the space between a light emitter of the light source and photosensitive areas of the detectors is approximately 0.1–0.15 inches.

13. The position detector as defined in claim 1 wherein said light blocker is of a butterfly configuration and includes means for maintaining the rigidity of said light blocker.

14. The position detector as defined in claim 13 wherein said light blocker is made of plastic.

15. The position detector as defined in claim 13 wherein said light blocker is made of a non-reflective, opaque material.

16. The position detector as defined in claim 1 wherein each of said multiple sector-shaped light detectors comprises of a photosensitive surface having a predetermined configuration and said light blocker is made of two light blocking segments, each of said segments configured to substantially match the predetermined configuration of said photosensitive surface of one of said sector-shaped light detectors.

17. The position detector as defined in claim 1 wherein each of said multiple sector-shaped light detectors comprises of a photosensitive surface having a predetermined configuration and said light blocker is made of two light blocking segments, each of said segments configured slightly larger than the predetermined configuration of said photosensitive surface of one of said sector-shaped light detectors.

18. The position detector as defined in claim 17 wherein each of said light blocking segments of the light blocker has an outer diameter sufficiently large to overlap the predetermined configuration of said photosensitive surface of one of said sector-shaped light detectors in order to substantially eliminate any problems associated with unwanted radial movement of the rotatable element.

19. The position detector as defined in claim 1 wherein said light source comprises a light emitter and a curved window covering said emitter.

20. The position detector as defined in claim 19 wherein window has a refractive property which enables the light source to act as point source of light that distributes light with uniform intensity through all angles in the forward direction thereby forming a wide angle emitter.

21. The position detector as defined in claim 19 wherein said light emitter is in the form of a light emitting chip.

22. A position detector for determining the angular position of a rotatable element having a longitudinal axis that extends in an axial direction, the detector comprising:

a single light source for directing a uniform wide angle field of light in a direction generally along the longitudinal axis;

a light detecting component aligned circumferentially about the rotatable element to receive light directly from said source, said light detecting component being arranged around the longitudinal axis and spaced from said light source and providing a linear output;

a light blocker operably connected to the rotatable element to rotate therewith about said longitudinal axis for periodically blocking portions of the light which impinge upon said light detecting component from said light source, said light blocker having one surface thereof closely spaced from said light source and another surface thereof closely spaced from said light detecting component, said linear output signal being correlatable to the rotational position of the light blocker; and output means for receiving the linear output from said light detecting component and utilizing said output to provide a reliable measurement of the angular position of the rotatable element.

23. The position detector as defined in claim 22, wherein the space between the light source and the detectors is essentially free of any object, except for the light blocker, so that the light from the light source can impinge directly upon at least those portions of said detectors which the light blocker is not blocking, without passing through any other object.

24. The position detector as defined in claim 22, wherein the space between the light blocker and the detectors is essentially free of any object.

25. The position detector as defined in claim 22, wherein the space between said another surface of the light blocker and photosensitive areas of the detectors is approximately 0.005–0.010 inches.

26. The position detector as defined in claim 25, wherein the space between a light emitter of the light source and photosensitive areas of the detectors is approximately 0.1–0.15 inches.

\* \* \* \* \*